UNITED STATES PATENT OFFICE.

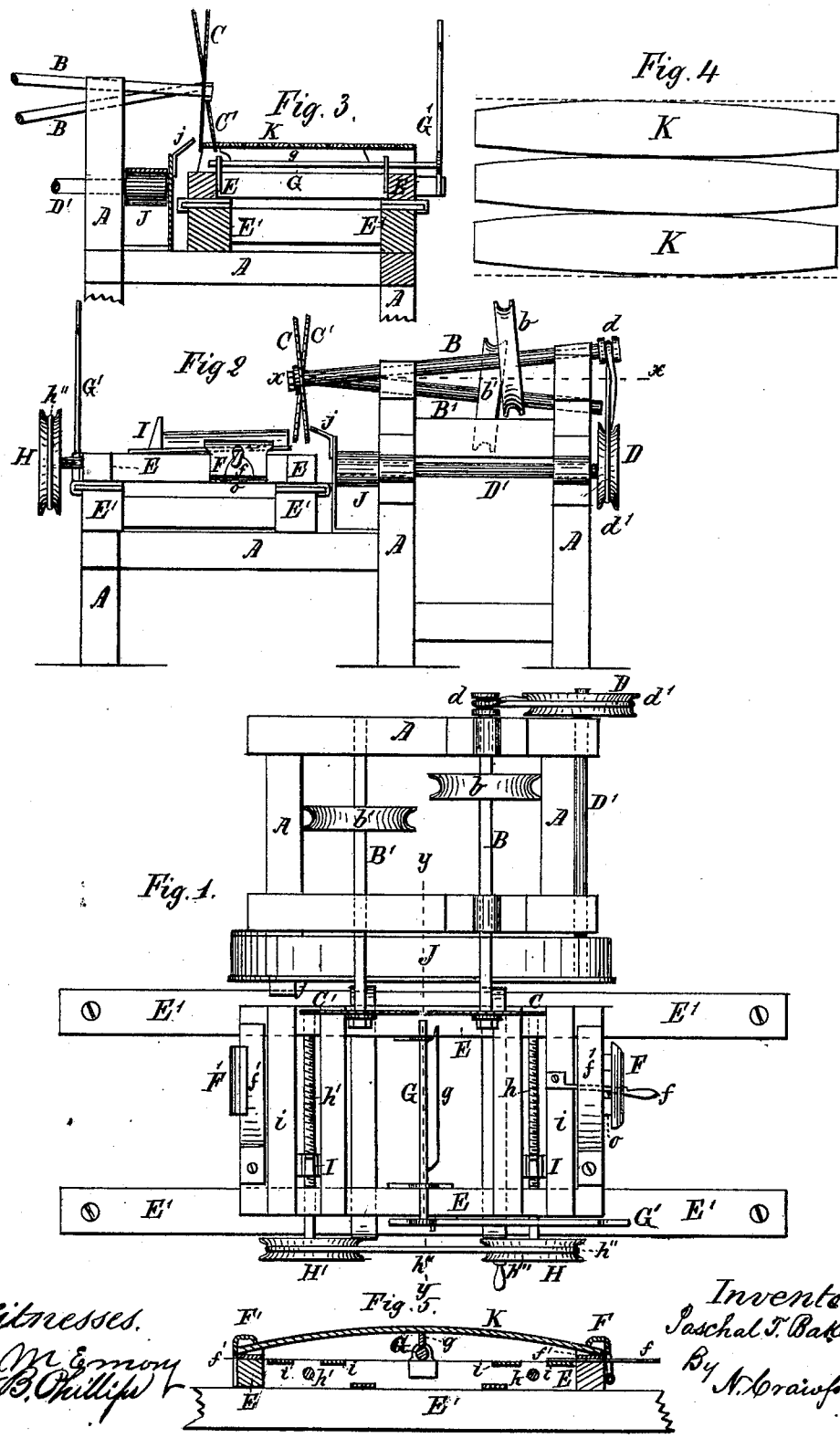

PASCHAL T. BAKER, OF CARROLLTON, KENTUCKY.

IMPROVEMENT IN STAVE-SAWING MACHINES.

Specification forming part of Letters Patent No. 220,331, dated October 7, 1879; application filed June 28, 1879.

*To all whom it may concern:*

Be it known that I, PASCHAL T. BAKER, of Carrollton, in the county of Carroll and State of Kentucky, have made certain Improvements in Machines for Sawing Staves from Plank, of which the following is a specification.

My invention consists in the construction and arrangement of the saws so that by one reciprocation of the plank by the saws the joints of the two adjacent staves are beveled and curved to shape; also, such arrangement of saws with other operating parts of the machine, and also other constructions and combinations of parts, as will be fully hereinafter described.

In the drawings, Figure 1 represents a top view of machine; Fig. 2, a transverse view of same; Fig. 3, a transverse sectional view of part of machine on line $y\ y$ of Fig. 1. Fig. 4 represents a top view of the plank from which the staves are to be sawed, showing the lines of the edges of the staves when sawed; and Fig. 5 is a longitudinal section of the stave, showing its curved position when clamped for sawing.

A represents the frame that supports the operating parts. B and B' represent the arbors of two saws journaled in bearings so that they will be out of a horizontal line, or that the ends opposite the saws will be one above a horizontal line, $x\ x$, and the other will be as much below the horizontal line. $b$ and $b'$ are pulleys on arbors B and B', and by which the arbors and their saws are revolved by any convenient power from either above or below them. C and C' are circular saws, saw C being fast on the end of arbor B, and saw C' is fast on arbor B', and so arranged that the centers of rotation will be on a horizontal line, while both are out of perpendicular, as seen in Fig. 2. D is a pulley on shaft D', and has a band, $d'$, around it and around pulley $d$ on end of arbor B. E is a rectangular reciprocating carriage freely sliding back and forth in ways E'. F and F' are clamps to hold the plank from which the staves are to be sawed firmly in place on the carriage while staves are to be sawed from it. Clamp F is hinged to the carriage at $o$ to turn out to receive the plank or to release a stave.

$f$ is a spring and notched holder-handle, made fast at its forward end to the carriage, and extends back through an opening in the clamp, and as the clamp is forced over upon the plank or stave it will be caught by a notch or tooth in the spring-holder and hold the clamp firmly upon the carriage until the spring-holder is pushed to one side and the clamp is free from the plank or stave. $f'\ f'$ are springs fast to top of carriage and at the end thereof, upon which the ends of the plank rest when clamped. G is a shaft placed transversely across and over the carriage E in proper bearings at each side of the carriage, and has a projecting wing, $g$, projecting from one side. G' is a lever on the outer end of shaft G, and rises parallel and on the side with the wing $g$. The purpose of this lever and winged shaft is to spring the plank from which the staves are to be sawed, and after the plank is firmly clamped into a curved position, as seen in Fig. 5, or into the curved shape the stave is to be when in a cask.

H and H' are band-pulleys on the outer ends of horizontal and transverse screw-shafts $h$ and $h'$, that are journaled into bearings at each side of the carriage. $h''$ is a band that goes around pulleys H and H'. $h'''$ is a crank-handle in pulley H, by turning which both screw-shafts $h$ and $h'$ are revolved the same way. I I are screw-nut knees that the shafts $h$ and $h'$ are screwed through, and when the shafts are revolved the knees will be forced by the screws to traverse across the carriage, back or forth, as the direction the pulleys are revolved. These knees rise above the top of the carriage, so as to engage the edge of the plank and feed it up to the saws as a stave is sawed from its edge, and are held from turning over by the traverse-guides $i\ i$, and between which they slide.

J is an endless carrier passing over a pulley on shaft D' and over another pulley at the opposite end of the machine from shaft D', and is put into operation by band $d'$ on pulley D of shaft D' and pulley $d$ on saw-arbor B. $j\ j$ are inclined chutes or guides that receive the stave as it is sawed off the edge of the plank, and guide it upon the endless carrier to be taken away from the machine.

The staves K are sawed from the edge of a plank in the form shown in Figs. 3 and 4 by first clamping the plank onto the carriage, then adjusting it by the screw-shafts and their knees so that only one saw, C', will be employed to make the first cut, then feed the plank by turning crank-handle and the screw-shafts to force the plank to the saws the width of a stave, when the carriage and plank are forced to the saws, and saw C will saw the beveled edge of the stave that is separated from the plank, and saw C' will saw the beveled edge for the next stave to be cut, and so on until the plank-bolt is cut into staves. The width of the staves to be sawed can be varied to suit the width of plank from which they are sawed.

I am aware that saws have been arranged to saw the beveled edges of staves. I am also aware that staves have been curved to the shape they are to assume when in a cask, and I do not claim either of these conditions, broadly; but What I do claim, and wish to secure by Letters Patent, is—

In a machine for sawing staves from plank, the combination of the two oblique saws C and C', carriage E, clamps F and F', and shaft G, having projecting wing $g$, and lever G' to curve the plank, constructed to operate as described.

PASCHAL T. BAKER.

Witnesses:
    JAS. T. HART,
    J. A. DONALDSON.